(12) United States Patent
Wang et al.

(10) Patent No.: US 9,305,025 B2
(45) Date of Patent: Apr. 5, 2016

(54) CONTENT SELECTION BASED ON IMAGE CONTENT

(71) Applicant: Google Inc., Mountain View, CA (US)

(72) Inventors: Jingbin Wang, Mountain View, CA (US); Xiangrong Chen, Fremont, CA (US); Charles J. Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 13/827,000

(22) Filed: Mar. 14, 2013

(65) Prior Publication Data

US 2014/0172884 A1 Jun. 19, 2014

Related U.S. Application Data

(60) Provisional application No. 61/737,648, filed on Dec. 14, 2012.

(51) Int. Cl.
G06F 17/30 (2006.01)

(52) U.S. Cl.
CPC .................. *G06F 17/30253* (2013.01)

(58) Field of Classification Search
None
See application file for complete search history.

(56) References Cited

U.S. PATENT DOCUMENTS

| 7,660,468 | B2 | 2/2010 | Gokturk et al. |
| 7,697,791 | B1 | 4/2010 | Chan et al. |
| 8,065,611 | B1 * | 11/2011 | Chan et al. ............... 715/253 |
| 8,165,915 | B1 | 4/2012 | Lucash |
| 2005/0091232 | A1 * | 4/2005 | Eschbach et al. ........... 707/100 |
| 2008/0069480 | A1 | 3/2008 | Aarabi et al. |
| 2008/0275850 | A1 * | 11/2008 | Asai ........................... 707/3 |
| 2009/0006391 | A1 * | 1/2009 | Ram ............................ 707/6 |
| 2009/0028434 | A1 * | 1/2009 | Vanhoucke et al. ......... 382/182 |
| 2009/0049104 | A1 * | 2/2009 | Pan ........................ 707/104.1 |
| 2009/0063455 | A1 * | 3/2009 | Li et al. ........................ 707/5 |
| 2010/0080470 | A1 | 4/2010 | Deluca et al. |
| 2012/0158525 | A1 | 6/2012 | Kae et al. |
| 2012/0220346 | A1 | 8/2012 | Yu et al. |

OTHER PUBLICATIONS

International Search Report and Written Opinion in International Application No. PCT/US2013/074591, dated Mar. 24, 2014, 12 pages.

* cited by examiner

*Primary Examiner* — Son T Hoang

(74) *Attorney, Agent, or Firm* — Fish & Richardson P.C.

(57) ABSTRACT

Methods, systems, and apparatus, include computer programs encoded on a computer-readable storage medium, for determining keywords for an image that supports an overlay content item. A method includes identifying, using one or more processors, an image that is to support an overlay content item, the image being presented on a web site and including a portion that is designated as being enabled to receive and display the overlay content item; evaluating pixel data associated with the image including determining one or more labels that are associated with content included within the image; and determining one or more keywords for the image based at least in part on the one or more labels.

14 Claims, 12 Drawing Sheets

```
┌─────────────────────────────────────────────────────────────────────────┐
│            Identify a creative associated with a campaign,         602  │
│      where the creative includes one or more associated keywords and    │
│ is a content item that is to be displayed on a web site responsive to a received request for content │
└─────────────────────────────────────────────────────────────────────────┘
                                    │
                                    ▼
┌─────────────────────────────────────────────────────────────────────────┐
│         Determine a prominence level of an image included in the creative │
│                                                                    604  │
└─────────────────────────────────────────────────────────────────────────┘
                                    │
                                    ▼
┌─────────────────────────────────────────────────────────────────────────┐
│ Provide as an input to an evaluation engine the keywords and the image and receiving as an output │
│   a relevance score for each keyword that indicates a relevance of a given keyword to the image │
│                                                                    606  │
└─────────────────────────────────────────────────────────────────────────┘
                                    │
                                    ▼
┌─────────────────────────────────────────────────────────────────────────┐
│             Accept the keywords based on the relevance scores           │
│       or alternatively suggest other keywords that are more relevant to the image │
│                                                                    608  │
└─────────────────────────────────────────────────────────────────────────┘
```

FIG. 6

CONTENT SELECTION BASED ON IMAGE CONTENT

CROSS-REFERENCE TO RELATED APPLICATION

This application claims priority to U.S. Provisional Application No. 61/737,648, filed on Dec. 14, 2012. The disclosure of the prior application is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for determining keywords for an image that supports an overlay content item. The method comprises: identifying, using one or more processors, an image that is to support an overlay content item, the image being presented on a web site and including a portion that is enabled to receive and display the overlay content item; evaluating pixel data associated with the image including determining one or more labels that are associated with content included within the image; and determining one or more keywords for the image based at least in part on the one or more labels.

These and other implementations can each optionally include one or more of the following features. One or more supplied keywords associated with the overlay content item can be evaluated, including: providing as an input to an evaluation engine the supplied keywords and the image; receiving as an output of the evaluation engine a relevance score for each supplied keyword that indicates a relevance of a given supplied keyword to the image; and accepting the supplied keywords based on the relevance scores or alternatively suggesting the use of the keywords determined based on the one or more labels as being the keywords for use as selection criteria to be associated with the overlay content item.

In general, another aspect of the subject matter described in this specification can be implemented in methods that include a method for determining keywords based on an image included in a landing page. The method comprises: identifying, using one or more processors, a landing page associated with a creative, the creative being a content item that is to be displayed on a web site responsive to a received request for content, wherein the creative includes one or more associated keywords; determining a prominence level of an image included in the landing page; when the prominence level exceeds a predetermined level, evaluating pixel data associated with the image including determining one or more labels that are associated with content included within the image; and determining one or more additional keywords for the creative based at least in part on the one or more labels.

These and other implementations can each optionally include one or more of the following features. The associated keywords and the additional keywords can be ranked. One or more top-ranked keywords can be selected as selection criteria to be associated with the creative. Ranking the associated keywords and the additional keywords can include: providing as an input to an evaluation engine the associated keywords, the additional keywords, and the image; receiving as an output of the evaluation engine a relevance score for each associated keyword and for each additional keyword that indicates a relevance of a given keyword to the image; and ranking the associated keywords and the additional keywords based on the relevance scores. The associated keywords can be augmented, including adding the additional keywords to the associated keywords and using the augmented keywords as selection criteria to be associated with the creative. Determining the prominence level of the image can include determining a relative size of the image, a relative location of the image, or a relative portion of the content that is embodied in the image.

In general, another aspect of the subject matter described in this specification can be implemented in methods that include a method for determining keywords for a creative. The method comprises: identifying a creative associated with a campaign, the creative being a content item that is to be displayed on a web site responsive to a received request for content, wherein the creative includes one or more associated keywords; determining a prominence level of an image included in the creative; when the prominence level exceeds a predetermined level, providing as an input to an evaluation engine the keywords and the image and receiving as an output a relevance score for each keyword that indicates a relevance of a given keyword to the image; and accepting the keywords based on the relevance scores or alternatively suggesting other keywords that are more relevant to the image.

These and other implementations can each optionally include one or more of the following features. Suggesting other keywords can include: evaluating pixel data associated with the image including determining one or more labels that are associated with content included within the image; and determining the suggested keywords for the image based at least in part on the one or more labels. Determining the prominence level of the image can include determining a relative size of the image, a relative location of the image, or a relative portion of the content that is embodied in the image.

In general, another aspect of the subject matter described in this specification can be implemented in methods that include a method for determining keywords for an image creative. The method comprises: identifying, using one or more processors, a creative associated with a campaign, the creative being a content item that is to be displayed on a web site responsive to a received request for content, wherein the creative is of the form of an image creative and includes an image but no textual information; evaluating pixel data associated with the image including determining one or more labels that are associated with content included within the image; determining candidate keywords for the image creative based at least in part on the one or more labels; ranking the candidate keywords based at least in part on a relevance of the keyword to the image including determining a relevance score for each candidate keyword; selecting one or more top-ranked keywords; and using the selected keywords as selection criteria for the image creative.

In general, another aspect of the subject matter described in this specification can be implemented in methods that include a method for determining keywords for a content item. The method comprises: identifying, using one or more processors, a content item that is to be displayed on or as a web site responsive to a received request for content; determining a prominence level of an image included in the content item; when the prominence level exceeds a predetermined level, evaluating pixel data associated with the image including determining one or more labels that are associated with content included within the image; and determining one or more keywords for the content item based at least in part on the one or more labels.

These and other implementations can each optionally include one or more of the following features. The content item can be a creative. The content item can be a landing page associated with a creative. The content item can be an advertisement. Determining the prominence level of the image can include determining a relative size of the image, a relative location of the image, or a relative portion of the content that is embodied in the image. One or more supplied keywords associated with the content item can be evaluated. The evaluation can include: providing as an input to an evaluation engine the supplied keywords and the image; receiving as an output of the evaluation engine a relevance score for each supplied keyword that indicates a relevance of a given supplied keyword to the image; and accepting the supplied keywords based on the relevance scores or alternatively suggesting the use of the keywords determined based on the one or more labels as being the keywords for use as selection criteria to be associated with the content item.

In general, another aspect of the subject matter described in this specification can be implemented in computer program products. A computer program product is tangibly embodied in a computer-readable storage device and comprises instructions that, when executed by a processor, cause the processor to: identify, using one or more processors, an image that is to support an overlay content item, the image being presented on a web site and including a portion that is designated as being enabled to receive and display the overlay content item; evaluate pixel data associated with the image including determining one or more labels that are associated with content included within the image; and determine one or more keywords for the image based at least in part on the one or more labels.

These and other implementations can each optionally include one or more of the following features. The product can further comprise instructions that, when executed by the processor, cause the processor to: evaluate one or more supplied keywords associated with the overlay content item including: providing as an input to an evaluation engine the supplied keywords and the image; receiving as an output of the evaluation engine a relevance score for each supplied keyword that indicates a relevance of a given supplied keyword to the image; and accepting the supplied keywords based on the relevance scores or alternatively suggesting the use of the keywords determined based on the one or more labels as being the keywords for use as selection criteria to be associated with the overlay content item.

In general, another aspect of the subject matter described in this specification can be implemented in systems. A system includes a content management system and an evaluation engine. The content management system is configured to identify, using one or more processors, an image that is to support an overlay content item, the image being presented on a web site and including a portion that is designated as being enabled to receive and display the overlay content item. The evaluation engine is configured to: evaluate pixel data associated with the image including determining one or more labels that are associated with content included within the image; and determine one or more keywords for the image based at least in part on the one or more labels.

These and other implementations can each optionally include one or more of the following features. The content management system can be further configured to: provide as an input to the evaluation engine the supplied keywords and the image; receive as an output of the evaluation engine a relevance score for each supplied keyword that indicates a relevance of a given supplied keyword to the image; and accept the supplied keywords based on the relevance scores or alternatively suggesting the use of the keywords determined based on the one or more labels as being the keywords for use as selection criteria to be associated with the overlay content item.

Particular implementations may realize none, one or more of the following advantages. A content item can be selected in response to a request for content based on image content of the content item matching characteristics of the request. Keywords can be associated with a content item based on image content of the content item. Existing keywords for a content item can be augmented or replaced with keywords that are more relevant to the content item than previously provided keywords.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flowchart of an example process for determining keywords for a creative.

DETAILED DESCRIPTION

A content item, such as a creative, an advertisement, a landing page associated with a creative, or an overlay content item, is identified. The identified content item is evaluated, including determining whether an image is included in the content item and whether the image included in the content item is sufficiently prominent. When an image is sufficiently prominent in the content item, the image is evaluated including evaluating pixel data associated with the image to determine one or more labels that are associated with content included within the image. One or more selection criteria (e.g., keywords) are determined for the content item based at least in part on the one or more labels.

Figure 1:
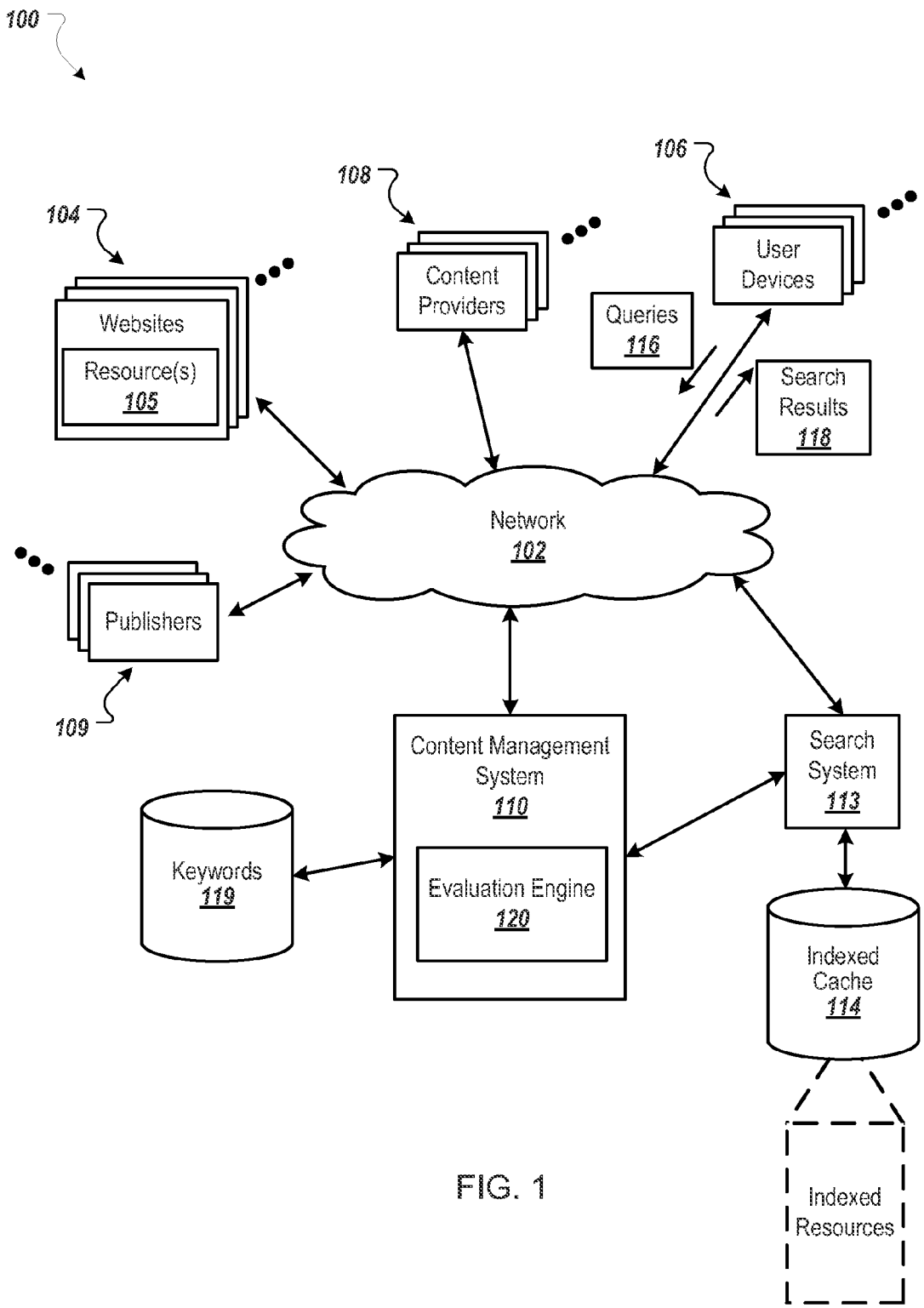
FIG. 1 is a block diagram of an example environment for providing content to a user.

FIG. 1 is a block diagram of an example environment 100 for providing content to a user. The example environment 100 includes a network 102 such as a local area network (LAN), wide area network (WAN), the Internet, or a combination thereof. The network 102 connects websites 104, user devices 106, content providers 108, publishers 109, and a content management system 110. The example environment 100 may include many thousands of websites 104, user devices 106, content providers 108, and publishers 109.

A website 104 includes one or more resources 105 associated with a domain name and hosted by one or more servers. An example website 104 is a collection of webpages formatted in hypertext markup language (HTML) that can contain text, images, multimedia content, and programming elements, e.g., scripts. Each website 104 is maintained by, for example, a publisher 109, e.g., an entity that controls, manages and/or owns the website 104.

A resource 105 is any data that can be provided over the network 102. A resource 105 is identified by a resource address that is associated with the resource 105. Resources 105 include HTML pages, word processing documents, and portable document format (PDF) documents, images, video, and feed sources, to name only a few examples. The resources 105 can include content, e.g., words, phrases, images and sounds that may include embedded information (such as meta-information in hyperlinks) and/or embedded instructions (such as scripts).

To facilitate searching of resources 105, the environment 100 can include a search system 113 that identifies the resources 105 by crawling and indexing the resources 105 provided by the publishers 109 on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices, tablet devices, and other devices that can send and receive data over the network 102. A user device 106 typically includes a user application, such as a web browser, to facilitate the sending and receiving of data over the network 102 and the presentation of content to a user.

A user device 106 can request resources 105 from a website 104. In turn, data representing the resource 105 can be provided to the user device 106 for presentation by the user device 106. User devices 106 can also submit search queries 116 to the search system 113 over the network 102. In response to a search query 116, the search system 113 can access the indexed cache 114 to identify resources 105 that are relevant to the search query 116. The search system 113 identifies the resources 105 in the form of search results 118 and returns the search results 118 to the user devices 106 in search results pages. A search result 118 is data generated by the search system 113 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116. A request for a resource 105 or a search query 116 can also include an identifier, such as a cookie, identifying the requesting user device 106 (e.g., in instances in which the user consents in advance to the use of such an identifier).

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110 (e.g., based on selection keywords accessed from a keywords datastore 119). One or more selected content items can be provided to the user device 106 in association with providing an associated resource 105 or search results 118. In some implementations, the content management system 110 can select content items based at least in part on results of an auction. For example, for the eligible content items, the content management system 110 can receive bids from content providers 108 and allocate the slots, based at least in part on the received bids (e.g., based on the highest bidders at the conclusion of the auction).

In some implementations, some content providers 108 prefer that the number of impressions allocated to their content and the price paid for the number of impressions be more predictable than the predictability provided by an auction. A content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

As described in more detail below, the content management system 102 can evaluate content items, such as creatives (e.g. image creatives or other creatives), landing pages associated with a creative, and overlay content items. For example, an evaluation engine 120 can evaluate a content item to determine a prominence level of an image included in the content item (e.g., based on the size and/or placement of images included in the content item). When the determined prominence level exceeds a predetermined level, the evaluation engine 120 can evaluate pixel data associated with the image to determine one or more labels that are associated with content included within the image. The evaluation engine 120 can determine one or more keywords for the content item based at least in part on the one or more labels and can store the determined keywords in association with the content item in the keywords datastore 119 (e.g., replacing or augmenting keywords that may exist in the keywords datastore 119 for the content item). The content management system 110 can use the keywords for the content item to identify the content item in response to a subsequent incoming request for content for a content slot. The content management system 110 can evaluate content items for which content owners have given consent for such evaluation. A content owner can indicate that evaluation is not to be performed for some or all content items owned by the content owner.

Figure 2:
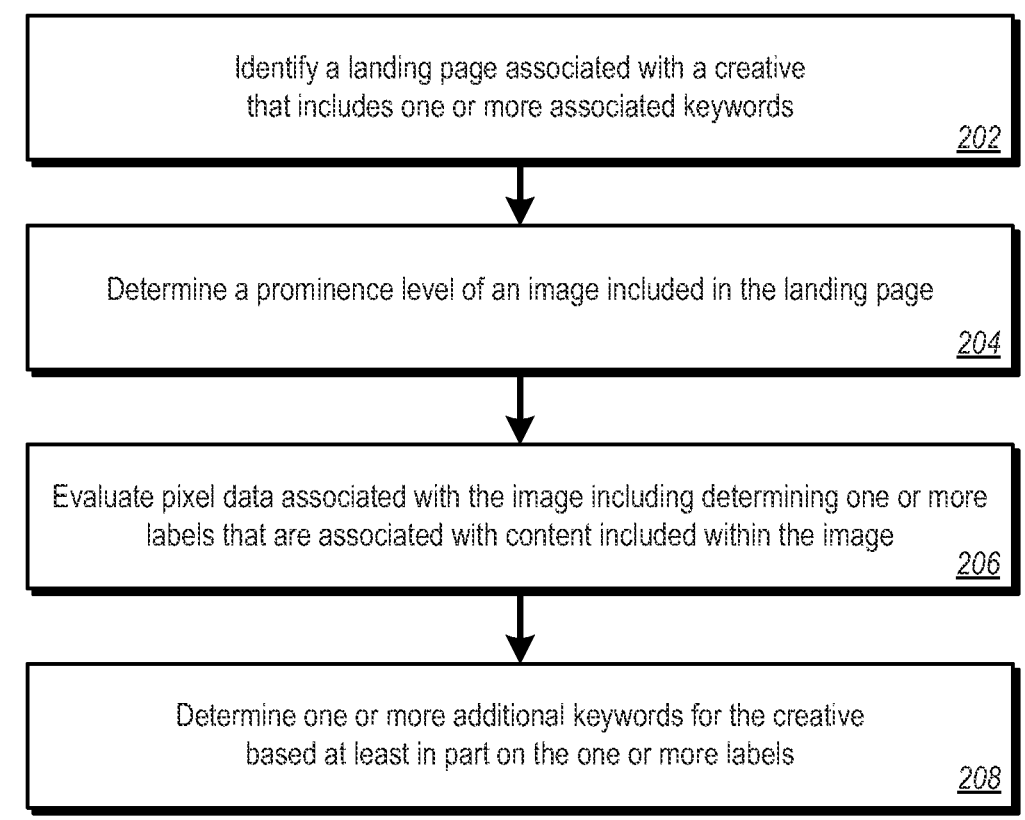
FIG. 2 is a flowchart of an example process for determining keywords for an image included in a landing page.
Figure 3:
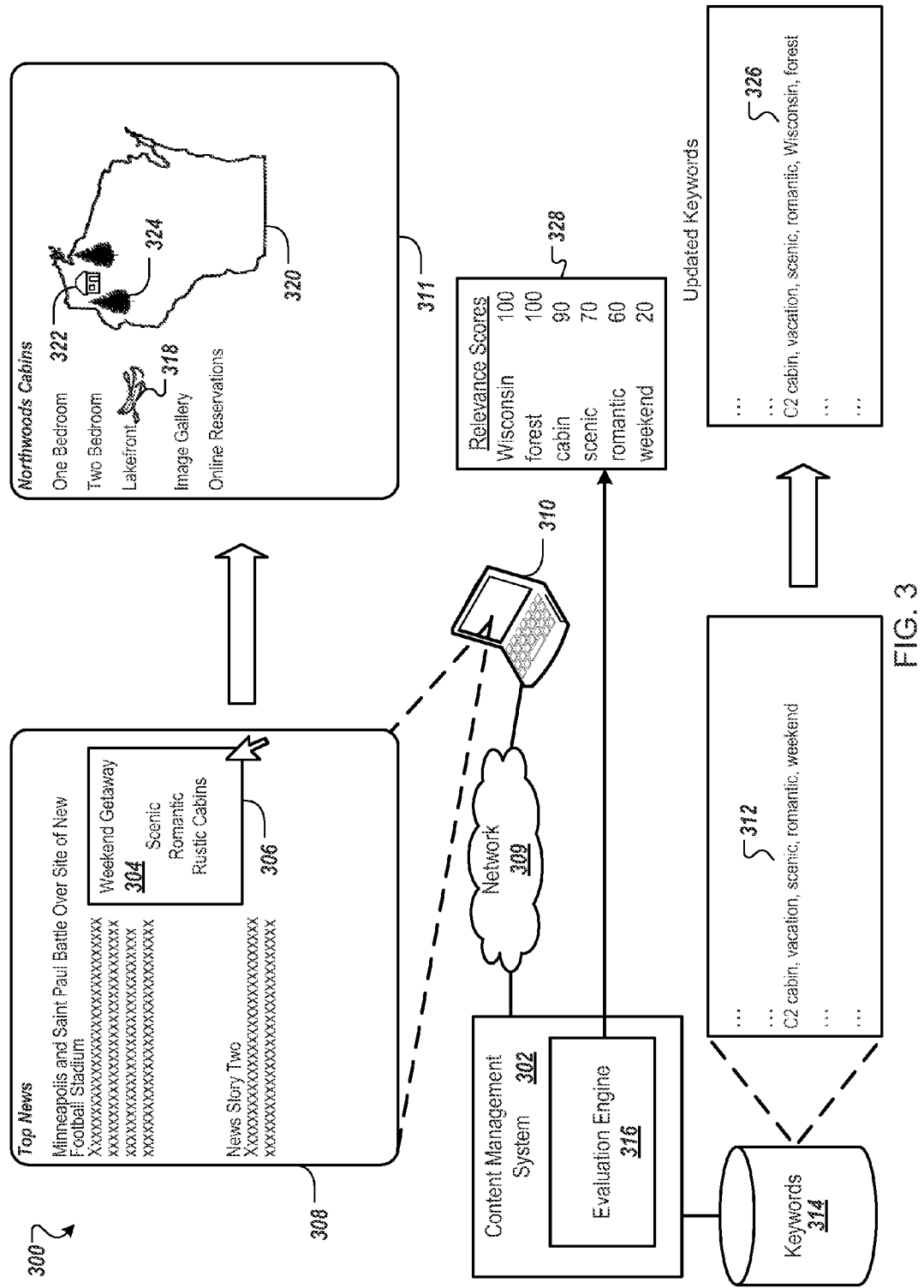
FIG. 3 is a block diagram of an example system for determining keywords based on an image included in a landing page.

FIG. 2 is a flowchart of an example process 200 for determining selection criteria (e.g., keywords) for an image included in a landing page. The process 200 can be performed, for example, by the content management system 110 described above with respect to FIG. 1. As another example, the process 200 can be performed by a content management system 302 included in a system 300 as illustrated in FIG. 3.

A landing page associated with a creative is identified using one or more processors (202), wherein the creative is a content item that is to be displayed on a web site responsive to a received request for content and wherein the creative includes selection criteria (e.g., one or more associated keywords). For instance, in the system 300 of FIG. 3, the content management system 302 can identify a content item 304 that is to be displayed in a content slot 306 on a web site 308 in response to a request for content received over a network 309 from a user device 310. The content management system 302 can identify a landing page 311 that is associated with the content item 304. Keywords 312 associated with the content item 304 can be stored in a datastore 314 that is accessible to the content management system 302. For example, the keywords 312 can include keywords of "cabin", "vacation", "scenic", "romantic", and "weekend". In some implementations, the keywords 312 are determined based at least in part on the textual content of the content item 304.

Referring again to FIG. 2, a prominence level of an image included in the landing page is determined (204). Determining the prominence level of the image can include determining a relative size of the image, a relative location of the image, or a relative portion of the content that is embodied in the image. For instance, in the example of FIG. 3, an evaluation engine 316 can evaluate the landing page 311 and can identify images that are included in the landing page 311. For example, the evaluation engine 316 can identify an image 318 of a canoe and an image 320 of the state of Wisconsin.

The evaluation engine 316 can determine whether the image 318 and/or the image 320 are sufficiently prominent. For example, the evaluation engine 316 can determine that the image 318 is not sufficiently prominent due to the size of the image 318 being less than a threshold size. As another example, the evaluation engine 316 can determine that the image 318 is not sufficiently prominent based on the location of the image 318 (e.g., the image 318 not being located at the top or in the center of the landing page 311). The evaluation engine 316 can determine that the image 320 is sufficiently prominent, for example, based on the size of the image 320 being more than a threshold size, based on the image 320 being located at or sufficiently near the center of the landing page 311, and/or based on the image 320 occupying more than a threshold portion of the content included in the landing page 311.

Referring again to FIG. 2, when the prominence level exceeds a predetermined level, pixel data associated with the image is evaluated including determining one or more labels that are associated with content included within the image (206). For instance, in the example, of FIG. 3, the evaluation engine 316 can evaluate pixel data associated with the image 320. The evaluation engine 316 can determine that the image 320 represents the state of Wisconsin and can identify sub images of a cabin 322 and trees 324. The evaluation engine 316 can determine, for example, labels of "Wisconsin", "cabin", "trees", and "forest" from the content of the image 320.

Referring again to FIG. 2, selection criteria are determined (e.g., one or more additional keywords are determined) for the creative based at least in part on the one or more labels (208). For instance, in the example of FIG. 3, additional keywords of "Wisconsin" and "forest" can be determined for the content item 304, based on labels determined for the image 320. The content management system 302 can augment the keywords 312 by adding the determined additional keywords to the keywords 312, as illustrated by updated keywords 326. The content management system 302 can use the updated keywords 326 as selection criteria to be associated with the content item 304.

In some implementations, the associated keywords and the additional keywords can be ranked and one or more top-ranked keywords can be selected as selection criteria to be associated with the creative. For example, the keywords 312, additional keywords determined from the image 320 (e.g., "Wisconsin", "forest"), and the image 320 can be provided as inputs to the evaluation engine 316. The evaluation engine 316 can rank the keywords 312 and the additional keywords and can generate as an output a relevance score for each keyword 312 and for each additional keyword that indicates a relevance of a given keyword to the image 320, as illustrated by relevance scores 328. The relevance scores 328 indicate respective relevance scores of 100, 100, 90, 70, 60, and 20 for keywords "Wisconsin", "forest", "cabin", "scenic", "romantic", and "weekend". A set of keywords can be selected, for example based at least in part on the relevance scores 328. For example, the top N keywords can be selected, or keywords that have a relevance score that is above a threshold can be selected. For example, the updated keywords 326 reflect that all keywords having an associated relevance score greater than fifty have been selected and that a keyword of "weekend" which has an associated relevance score of less than fifty is not included in the updated keywords 326. In some implementations, keywords are selected based on the relevance scores 328 and on other factors, such as based on the textual content of the content item 304 and/or of the landing page 311.

Figure 4:
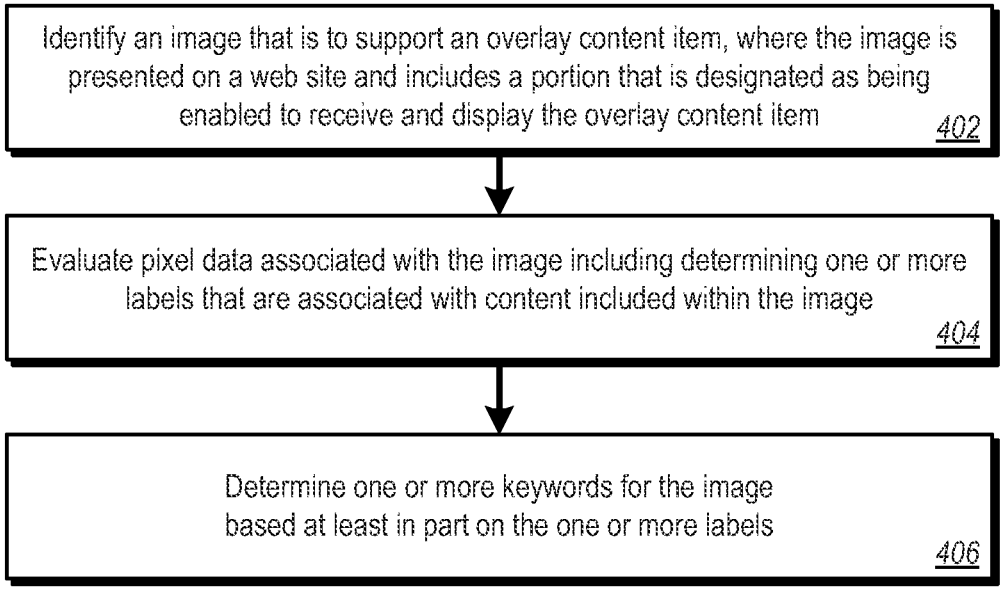
FIG. 4 is a flowchart of an example process for determining keywords for an image that supports an overlay content item.
Figure 5:
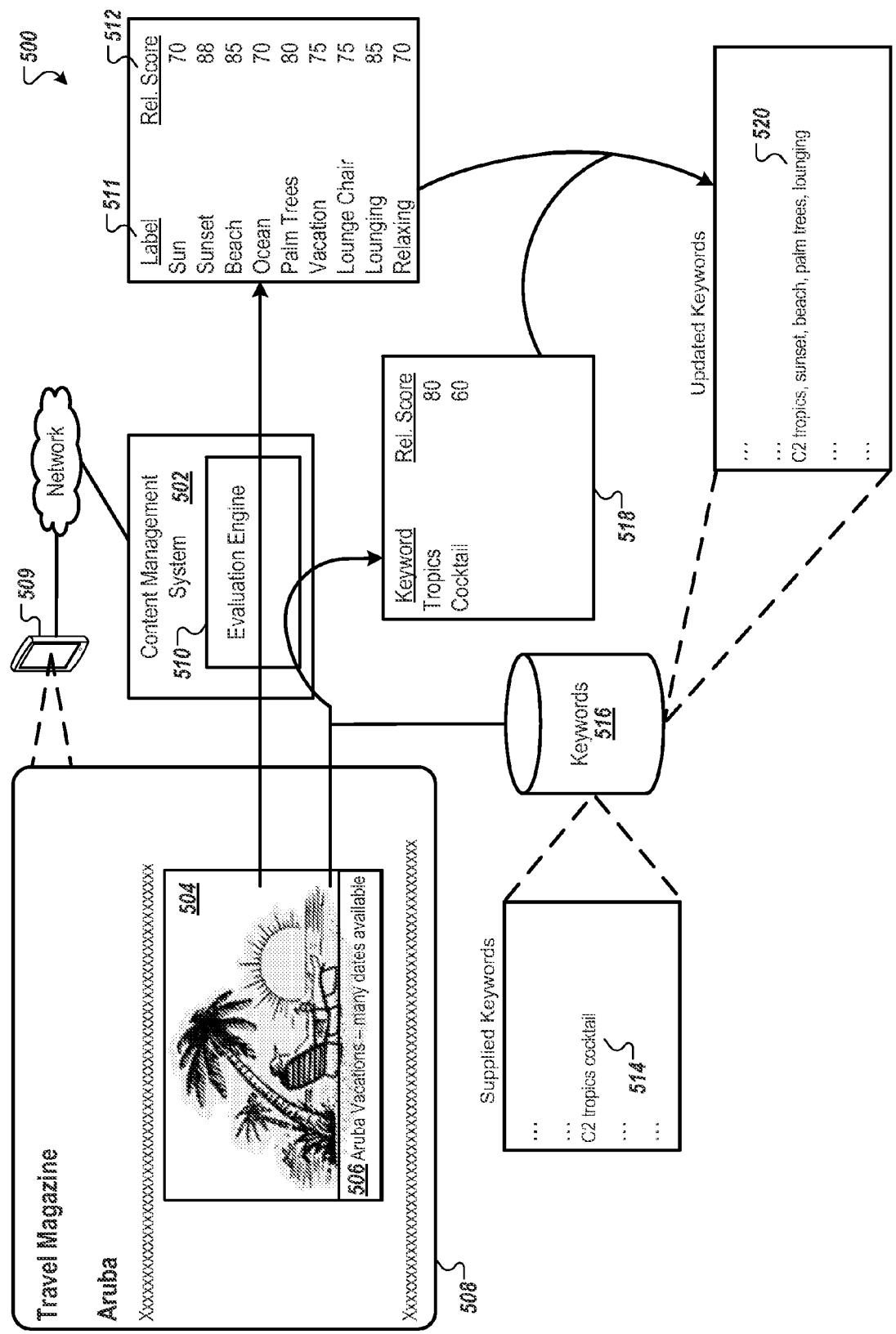
FIG. 5 is a block diagram of an example system for determining keywords for an image that supports an overlay content item.

FIG. 4 is a flowchart of an example process 400 for determining keywords for an image that supports an overlay content item. The process 400 can be performed, for example, by the content management system 110 described above with respect to FIG. 1. As another example, the process 400 can be performed by a content management system 502 included in a system 500 as illustrated in FIG. 5.

An image that is to support an overlay content item is identified using one or more processors (402). The image is presented on a web site and includes a portion that is designated as being enabled to receive and display the overlay content item. For instance, in the system 500 of FIG. 5, the content management system 502 can identify an image 504 that supports an overlay content item 506 and is presented on a web page 508. The image 504 is included in the web page 508, along with other content of the web page 508. The content item 506, which is positioned at and overlays the bottom of the image 504, can be semi-transparent, allowing the user to view the bottom of the image 504 through the content item 506. The web page 508 can be, for example, a web page that is included in a web site for a travel magazine. The web page 508 can be presented, for example, on a user device 509.

Referring again to FIG. 4, pixel data associated with the image is evaluated (404), including determining one or more labels that are associated with content included within the image. For instance, in the example of FIG. 5, an evaluation engine 510 can evaluate pixel data associated with the image 504. The evaluation engine 510 can identify one or more objects included in the image 504, such as a sunset, a beach, palm trees, and a lounge chair, and can determine, for example, corresponding labels of "sun", "sunset", "beach", "ocean", "palm trees", "vacation", "lounge chair", "lounging", "relaxing", etc.

Referring again to FIG. 4, selection criteria (e.g., one or more keywords) are determined for the image based at least in part on the one or more labels (406). For example, in some implementations, a keyword is determined for each determined label (e.g., in the example of FIG. 5, keywords of "sun", "sunset", "beach", "ocean", "palm trees", "vacation", "lounge chair", "lounging", and "relaxing" can be determined). In some implementations, a relevance score which indicates a relevance to the image 504 is determined for each determined label and a keyword is determined for each label that has a relevance score that is above a threshold. For example, as illustrated by labels 511 and relevance scores 512, the evaluation engine 510 can determine a relevance score 512 for each label 511 determined from the image 504, and can identify labels 511 that have a relevance score 512 equal to or above, for example, a threshold of eighty as selection criteria for use by the system (e.g., resulting in keywords of "sunset", "beach", "palm trees", and "lounging").

In some implementations, the selection criteria are new selection criteria for the image 504 (e.g., new, initial keywords can be determined for the image 504 for which no keywords exist). In some implementations, the evaluation engine 510 can determine if previously supplied selection criteria (e.g., keywords) exist for the image 504. For example, the evaluation engine 510 can determine that, prior to the evaluation of the image 504, supplied keywords 514 exist for the image 504 in a keywords datastore 516. The evaluation engine 510 can evaluate the supplied keywords 514 and the image 504 to produce a relevance score for each supplied keyword 514 that indicates a relevance of a given supplied keyword 514 to the image 504, as illustrated by a table 518. In some implementations, the evaluation engine 510 accepts the supplied keywords 514 as keywords for the image 504, such as if the relevance scores for the supplied keywords are, on average, higher than a threshold or higher than relevance scores for keywords determined from the labels 511. As another example, the evaluation engine 510 can select or suggest the use of the keywords determined from the labels 511 as keywords for the image 504 if the keywords determined from the labels 511 have, on average, higher relevance scores than the supplied keywords 514.

In some implementations, the supplied keywords 514 are augmented by some or all of the keywords determined from the labels 511. For example, updated keywords for the content item 504 can include a union of the supplied keywords 514 and keywords determined from the labels 511. As another example, the supplied keywords 514 can be augmented with keywords determined from the labels 511 which have a relevance score that is above a threshold. As yet another example, updated keywords 520 for the image 504 can include a union of supplied keywords 514 that have a relevance score above a threshold (e.g., "tropics" but not "cocktail") and keywords determined from the labels 511 that have a relevance score above a threshold (e.g., "sunset", "beach", "palm trees", and "lounging").

Figure 7:
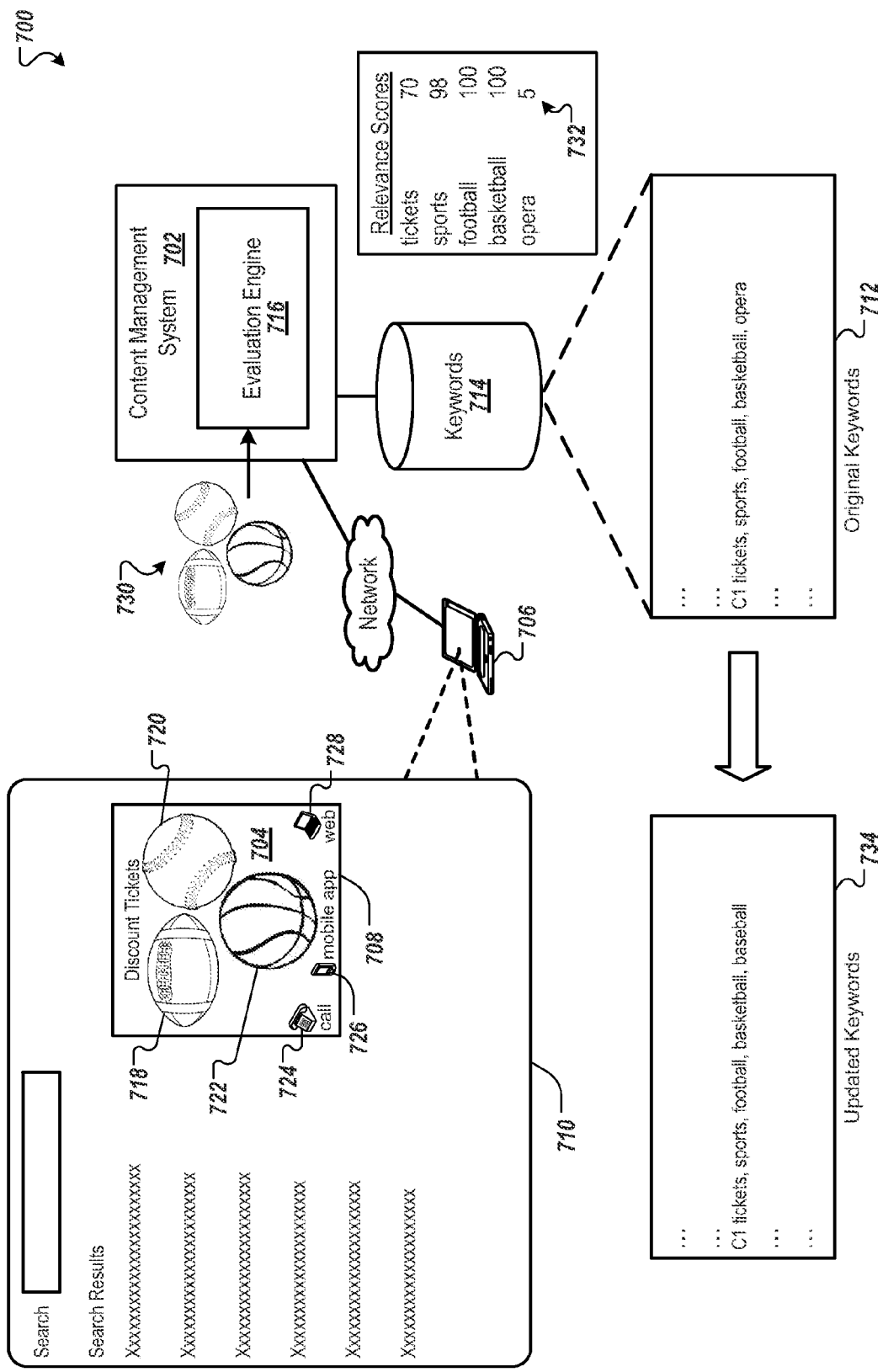
FIG. 7 is a block diagram of an example system for determining keywords for a creative.

FIG. 6 is a flowchart of an example process 600 for determining selection criteria for use with a creative. The process 600 can be performed, for example, by the content management system 110 described above with respect to FIG. 1. As another example, the process 600 can be performed by a content management system 702 included in an example system 700 as illustrated in FIG. 7.

A creative associated with a campaign is identified (602), wherein the creative is, for example, a content item that is to be displayed on a web site responsive to a received request for content, and wherein the creative includes associated selection criteria. For instance, in the example of FIG. 7, the content management system 702 can identify a creative 704 in response to a request for content received from a client device 706 for a content slot 708 included in a web page 710. The creative 704 can be associated with keywords 712 in a keywords datastore 714 of "tickets", "sports", "football", "basketball", and "opera".

Referring again to FIG. 6, a prominence level of an image included in the creative is determined (604). For example, determining the prominence level can include determining a relative size of the image, a relative location of the image, or a relative portion of the content that is embodied in the image. For instance, in the example of FIG. 7, an evaluation engine 716 can evaluate the creative 704 and can determine that images of a football 718, a baseball 720, and a basketball 722 are sufficiently prominent (e.g., based on the size and/or the position of the respective images 718, 720, and 722). The evaluation engine 716 can determine that other images, including images of a phone 724, a mobile device 726, and a laptop 728 are not sufficiently prominent, due, for example, to the relatively small sizes and the bottom border placement of the images 724, 726, and 728.

Referring again to FIG. 6, when the prominence level exceeds a predetermined level, the keywords and the image are provided as an input to an evaluation engine and a relevance score is received as an output for each keyword that indicates a relevance of a given keyword to the image (606).

For instance, in the example of FIG. 7, the keywords 712 and an image 730 that includes the football 718, the baseball 720, and the basketball 722 can be provided to the evaluation engine 716. The evaluation engine 716 can evaluate the image 730 and can determine relevance scores 732 for each of the keywords 712 (e.g., the relevance scores 732 include scores of 70, 98, 100, 100, and 5 for the keywords "tickets", "sports", "football", "basketball", and "opera", respectively).

Referring again to FIG. 6, the selection criteria are accepted/validated based on the relevance scores or alternatively other selection criteria can be suggested (608). For example, the entire set of keywords can be accepted if, on average, the relevance scores for the keywords are greater than a threshold. As another example, a given keyword can be accepted if the relevance score for the given keyword is greater than a threshold. For instance, in the example of FIG. 7, if a threshold is 90, the keywords "sports", "football", and "basketball" can be accepted and the keywords "tickets" and "opera" can be rejected.

In some implementations, the evaluation engine 716 can determine labels associated with the image 730, can determine other potential selection criteria (e.g., keywords not included in the keywords 712) based on the determined labels, and can determine a relevance score for the selection criteria. For example, the evaluation engine 716 can identify a potential keyword of "baseball" from the image 730 and can determine a corresponding relevance score of 100 for the "baseball" keyword. The evaluation engine 716 can determine a set of keywords for the creative 704 from the union of the keywords 712 that have a relevance score greater than a threshold (e.g., keywords of "sports", "football", and "basketball") and other keywords (e.g., "baseball") determined from the image 730, such as those keywords that have a relevance score greater than a threshold. For example, a resulting keyword set of "baseball", "sports", "football", and "basketball" can be determined.

In some implementations, the evaluation engine 716 can determine whether to associate a keyword with the creative 704 based on an image-relevance score for the keyword which indicates a relevance to image content of the creative 704 and on a text-relevance score which indicates a relevance to textual content of the creative 704. For example, the evaluation engine 716 can determine that the image-relevance score is 70 for the "tickets" keyword, as indicated by the relevance scores 732, and can determine that the text-relevance score is 100 for the "tickets" keyword, based on evaluating the textual content of the creative 704. The evaluation engine 716 can determine to associate the "tickets" keyword with the creative 704, for example, if one or more of the following conditions (or other conditions) are met: 1) the image-relevance score is above a first threshold (e.g., 80); 2) the text-relevance score is above a second threshold (e.g., 90); 3) the average of the image-relevance score and the text-relevance score is above a third threshold (e.g., 80); 4) the image-relevance score is above a fourth threshold (e.g., 69) and the text-relevance score is above a fifth threshold (e.g., 90).

For example, the evaluation engine 716 can determine to associate the "tickets" keyword with the creative 716 based on the fourth example condition listed above. The fourth condition can correspond, for example, to the "tickets" keyword "somewhat" matching the image 730 and "strongly" matching the textual content of the creative 704. Updated keywords 734 indicate that the "tickets" keyword is still associated with the creative 704, as are keywords of "sports", "football", and "basketball" (e.g., based on those keywords having image-relevance scores above a threshold), and a keyword "baseball" (e.g., based on the evaluation engine 716 identifying "baseball" as a keyword associated with the image 730).

Figure 8:
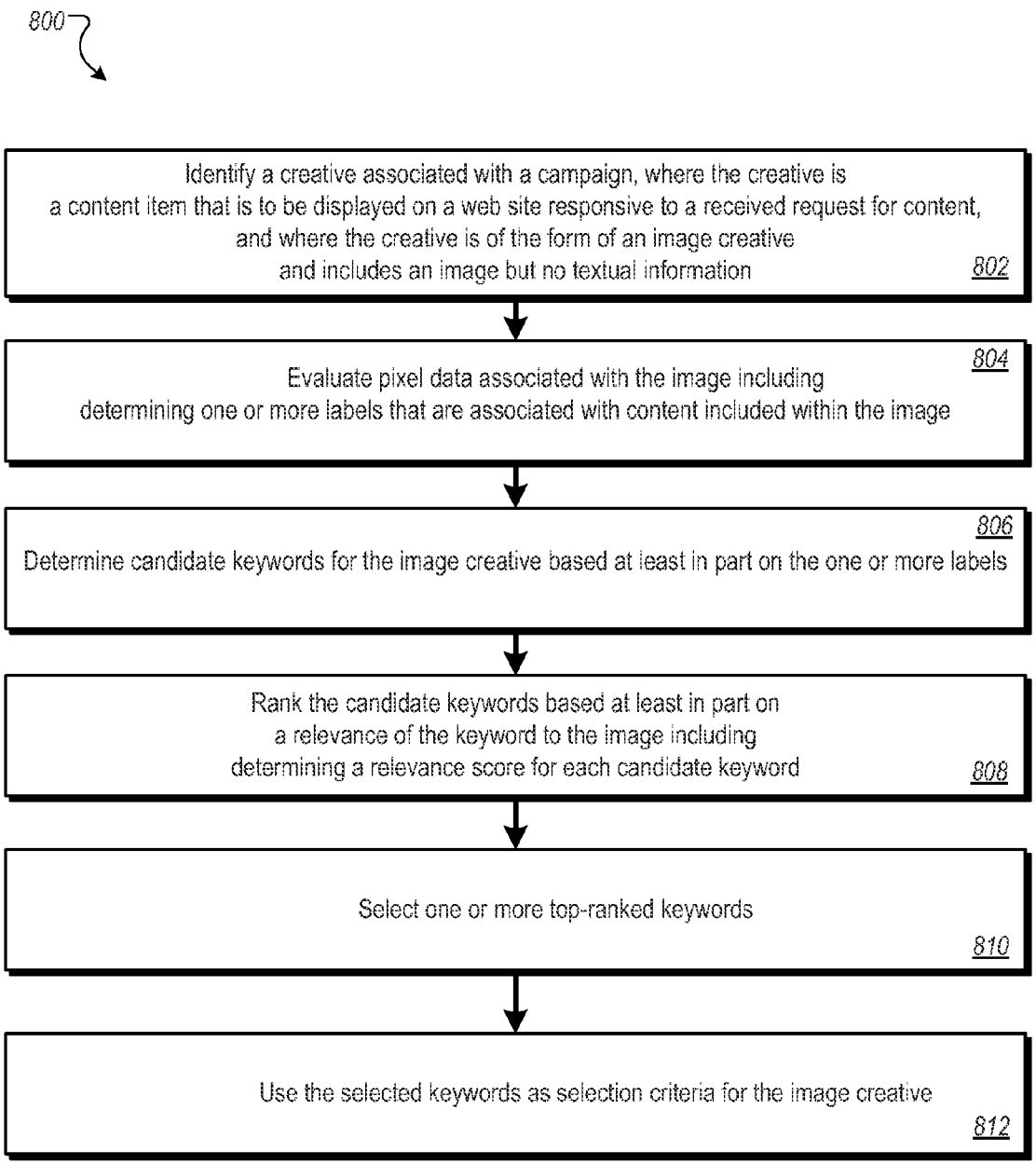
FIG. 8 is a flowchart of an example process for determining keywords for an image creative.
Figure 9:
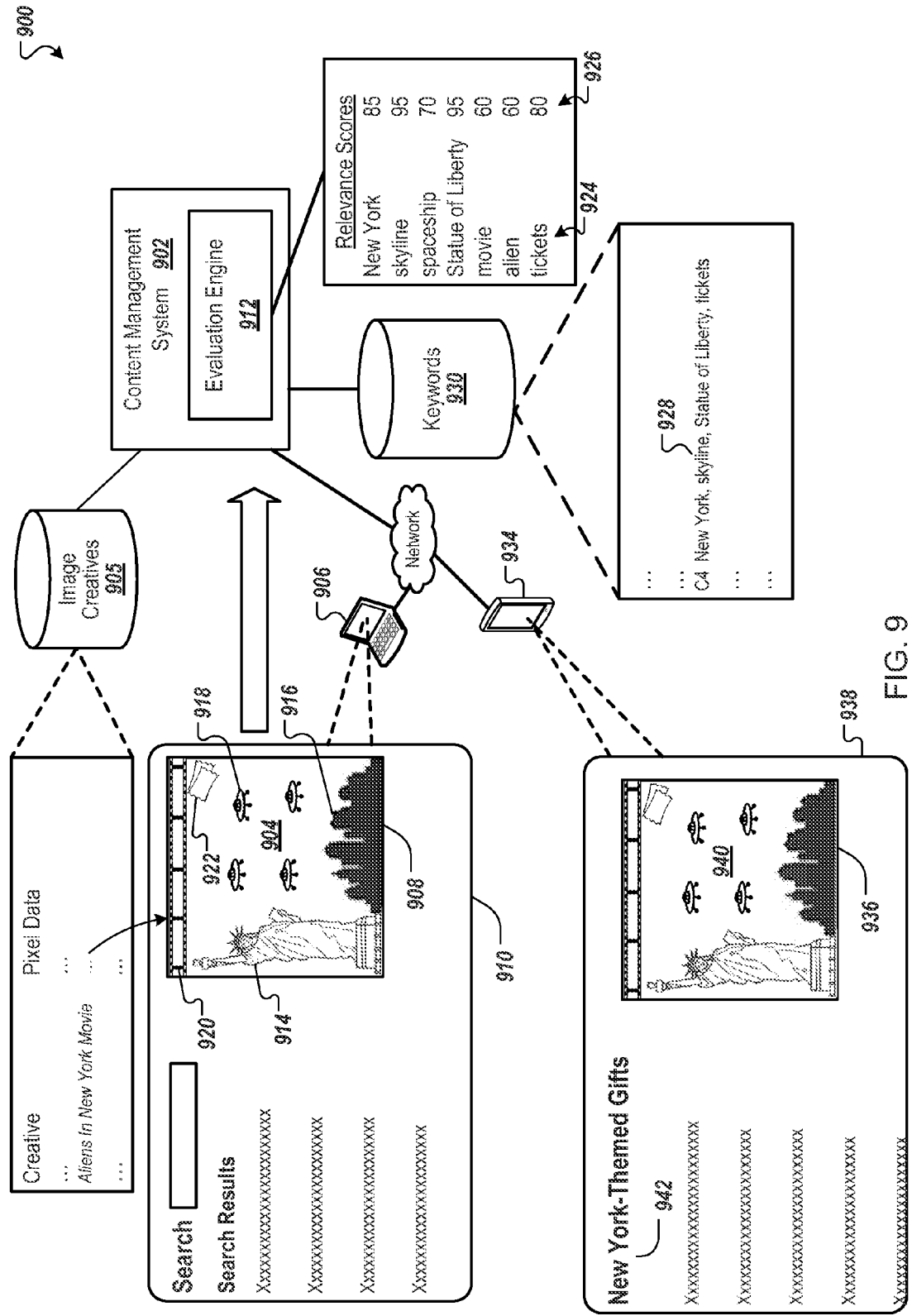
FIG. 9 is a block diagram of an example system for determining keywords for an image creative.

FIG. 8 is a flowchart of an example process 800 for determining selection criteria for an image creative. The process 800 can be performed, for example, by the content management system 110 described above with respect to FIG. 1. As another example, the process 800 can be performed by a content management system 902 included in an example system 900 as illustrated in FIG. 9.

A creative associated with a campaign is identified using one or more processors (802), wherein the creative is a content item that is to be displayed on a web site responsive to a received request for content and wherein the creative is of the form of an image creative and includes an image but no textual information. For instance, in the example of FIG. 9, the content management system 902 can identify an image creative 904 from an image creatives datastore 905 in response to a request for content received from a client device 906 for a content slot 908 included in a web page 910. The image creative 904, which is an image of a movie poster for an "Aliens in New York" movie, includes image content but does not include textual content.

Referring again to FIG. 8, pixel data associated with the image is evaluated including determining one or more labels that are associated with content included within the image (804). For instance, in the example of FIG. 9, an evaluation engine 912 can evaluate the image creative 904 and can identify objects included in the image creative 904, such as a "Statue of Liberty" object 914, a New York skyline 916, a spaceship 918, a movie reel 920, and tickets 922. Based on the identified objects, the evaluation engine 912 can determine a set of corresponding labels, such as "New York", "skyline", "spaceship", "Statue of Liberty", "movie", "alien", and "tickets", as illustrated by labels 924.

Referring again to FIG. 8, candidate selection criteria for the image creative are determined based at least in part on the one or more labels (806). For example, for each label, a corresponding candidate keyword can be determined where the candidate keyword matches the label.

The candidate selection criteria are ranked based at least in part on a relevance of the selection criteria to the image (808). For instance, in the example of FIG. 9, the evaluation engine 912 can determine a relevance score for each of the labels 924 (e.g., where each label in the labels 924 corresponds to a candidate keyword), as illustrated by relevance scores 926. For example, relevance scores of 85, 95, 70, 95, 60, 60, and 80 can be determined for the labels "New York", "skyline", "spaceship", "Statue of Liberty", "movie", "alien", and "tickets", respectively.

Referring again to FIG. 8, one or more top-ranked selection criteria are selected (810). For example, the top N ranked keywords can be selected, where N is a positive integer. As another example, a keyword can be selected if a relevance score associated with the keyword is greater than a threshold. In the example of FIG. 9, the evaluation engine 912 can, for example, select the top three ranked keywords (e.g., keywords corresponding to the "skyline", "Statue of Liberty", and "New York" labels). As another example, as illustrated by selected keywords 928, the evaluation engine 912 can select keywords that have an associated relevance score equal to or above a threshold of, for example, eighty. The selected keywords 928 can be stored, for example, in a keywords datastore 930, in association with the image creative 904.

Referring again to FIG. 8, the selected keywords are used as selection criteria for the image creative (812). The selected keywords can be used, at least in part, to select the image creative in response to a received request for content. For instance, in the example of FIG. 9, the content management system 902 can select the image creative 904 in response to a request for content received from a client device 934 for a content slot 936 included in a web page 938, as illustrated by a presented content item 940. The image creative 904 can be selected, for example, based at least in part on the selected keywords 928 for the image creative 904 matching textual content 942 included in the web page 938.

Figure 10:
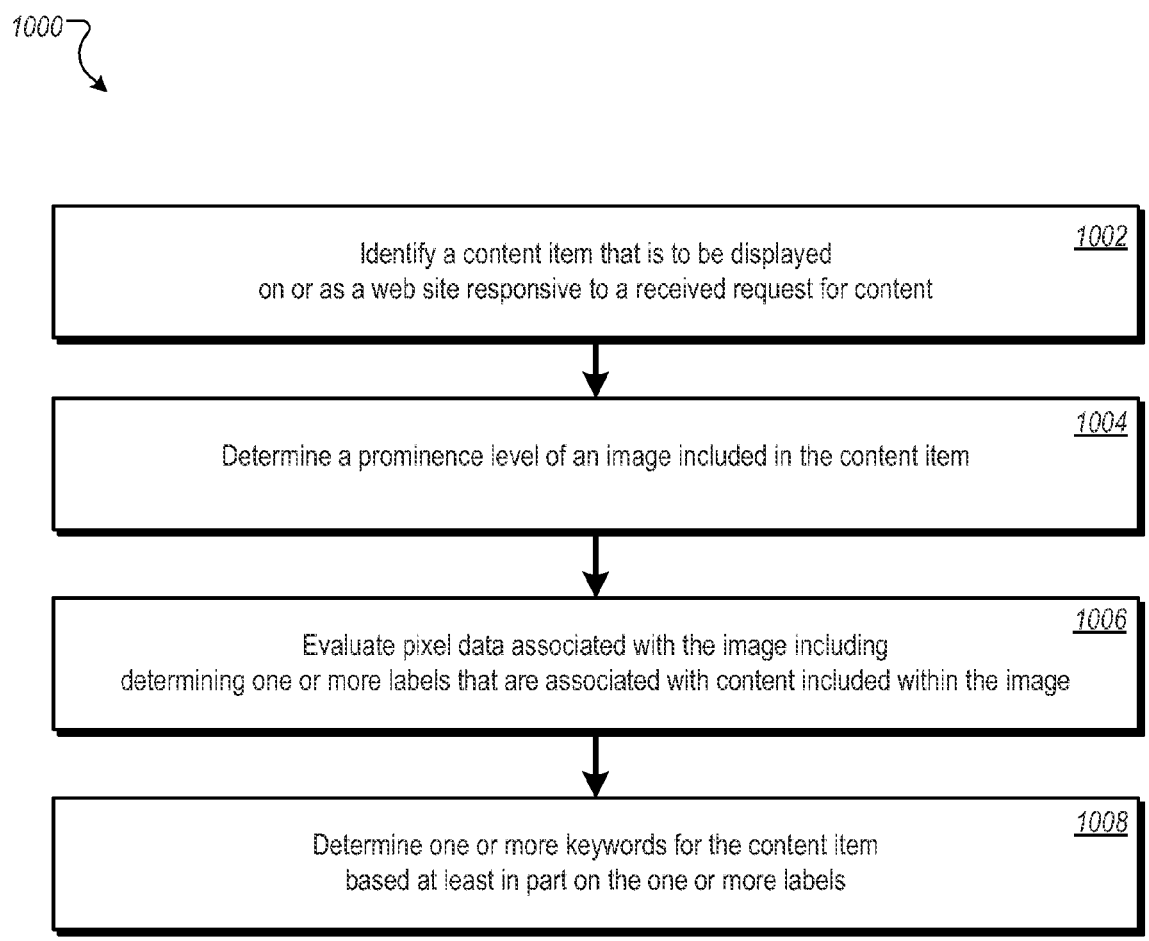
FIG. 10 is a flowchart of an example process for determining keywords for a content item.
Figure 11:
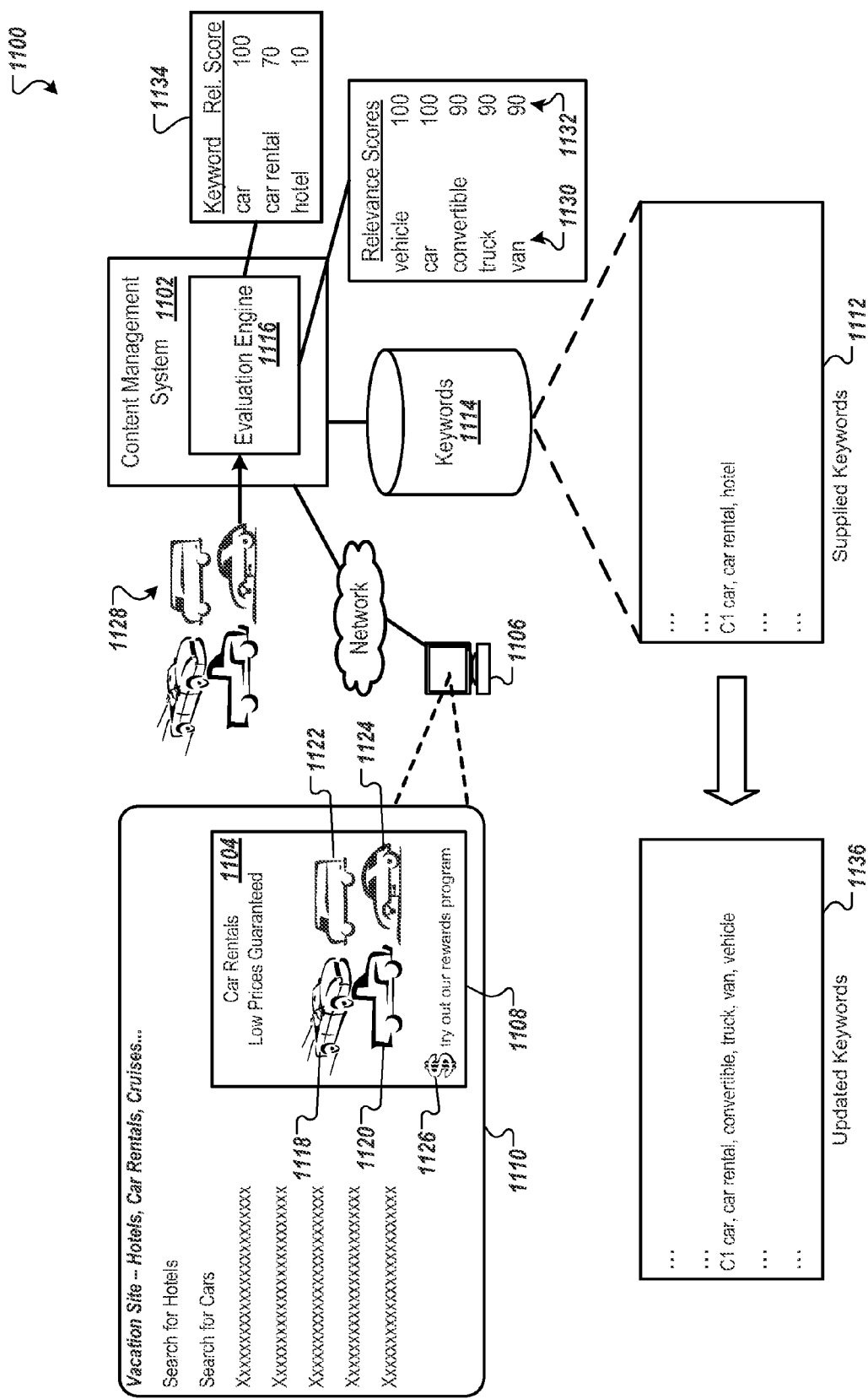
FIG. 11 is a block diagram of an example system for determining keywords for a content item.

FIG. 10 is a flowchart of an example process 1000 for determining selection criteria for a content item. The process 1000 can be performed, for example, by the content management system 110 described above with respect to FIG. 1. As another example, the process 1000 can be performed by a content management system 1102 included in an example system 1100 as illustrated in FIG. 11.

A content item that is to be displayed on or as a web site responsive to a received request for content is identified using one or more processors (1002). The content item can be, for example, a creative, such as an image creative, a landing page associated with a creative, an advertisement, or some other type of content item. The creative can be associated with one or more supplied keywords. For instance, in the example of FIG. 11, the content management system 1102 can identify a content item 1104 in response to a request for content received from a client device 1106 for a content slot 1108 included in a web page 1110. The content item 1104 can be associated with keywords 1112 in a keywords datastore 1114 of "car", "car rental", and "hotel".

Referring again to FIG. 10, a prominence level of an image included in the content item is determined (1004). Determining the prominence level can include determining a relative size of the image, a relative location of the image, or a relative portion of the content that is embodied in the image. For instance, in the example of FIG. 11, an evaluation engine 1116 can evaluate the content item 1104 and can identify images that are included in the content item 1104. For example, the evaluation engine 1116 can identify images 1118, 1120, 1122, 1124, and 1126 of a convertible, a truck, a van, a car, and a dollar sign, respectively.

The evaluation engine 1116 can determine whether any of the images 1118-1126 are sufficiently prominent. For example, the evaluation engine 1116 can determine that the dollar sign image 1126 is not sufficiently prominent due to the size of the dollar sign image 1126 being less than a threshold size or less than a threshold portion of the content item 1104. As another example, the evaluation engine 1116 can determine that the dollar sign image 1126 is not sufficiently prominent based on the location of the dollar sign image 1126 (e.g., the dollar sign image 1126 not being located at the top or in the center of the content item 1104). The evaluation engine 1116 can determine that each of the images 1118, 1120, 1122, and 1124 are sufficiently prominent, for example, based on the sizes of the images 1118, 1120, 1122, and 1124 being more than a threshold size, based on the images 1118, 1120, 1122, and 1124 being located at or sufficiently near the center of the content item 1104, and/or based on the images 1118, 1120, 1122, and 1124 occupying more than a threshold portion of the content item 1104.

Referring again to FIG. 10, when the prominence level exceeds a predetermined level, pixel data associated with the image is evaluated (1006), including determining one or more labels that are associated with content included within the image For instance, in the example of FIG. 11, the evaluation engine 1116 can evaluate pixel data associated with the images 1118, 1120, 1122, and 1124, as illustrated by a composite image 1128 being provided as an input to the evaluation engine 1116. The evaluation engine 1116 can, for example, identify "vehicle", "car", and "convertible" labels associated with the convertible image 1118, "vehicle" and "truck" labels associated with the truck image 1120, "vehicle" and "van" labels associated with the van image 1122, and "vehicle" and "car" labels associated with the car image 1124.

Referring again to FIG. 10, selection criteria (e.g., one or more keywords) for the content item are determined based at least in part on the one or more labels (1008). For example, in some implementations, a keyword is determined for each unique label (e.g., in the example of FIG. 11, keywords of "vehicle", "convertible", "truck", "van", and "car" can be determined). In other implementations, a relevance score which indicates a relevance to a prominent image is determined for each determined label and a keyword is determined for each label that has a relevance score that is above a threshold. For example, as illustrated by labels 1130 and relevance scores 1132, the evaluation engine 1116 can determine a relevance score 1132 for each label 1130 determined from the content item 1104, and can determine as keywords labels 1130 that have a relevance score 1132 equal to or above, for example, a threshold of ninety (e.g., resulting in keywords of "vehicle", "car", "convertible", "truck" and "van").

In some implementations, the selection criteria are new selection criteria for the content item (e.g., new, initial keywords can be determined for the content item for which no keywords exist). In some implementations, the evaluation engine 1116 can evaluate the supplied keywords 1112 and the composite image 1128 to produce a relevance score for each supplied keyword 1112 that indicates a relevance of a given supplied keyword 1112 to the composite image 1128, as illustrated by a table 1134. In some implementations, the evaluation engine 1116 accepts the supplied keywords 1112 as keywords for the content item 1104, such as if the relevance scores for the supplied keywords 1112 are, on average, higher than a threshold or higher than relevance scores for keywords determined from the labels 1130. As another example, the evaluation engine 1116 can select or suggest the use of the keywords determined from the labels 1130 as keywords for the content item 1104 if the keywords determined from the labels 1130 have, on average, higher relevance scores than the supplied keywords 1112.

In some implementations, the supplied keywords 1112 are augmented by some or all of the keywords determined from the labels 1130. For example, updated keywords for the content item 1104 can include a union of the supplied keywords 1112 and keywords determined from the labels 1130. As another example, the supplied keywords 1112 can be augmented with keywords determined from the labels 1130 which have a relevance score that is above a threshold. As yet another example, updated keywords 1134 for the content item 1104 can include a union of the supplied keywords 1112 that have a relevance score above a threshold (e.g., "car" and "car rental" but not "hotel") and keywords determined from the labels 1130 that have a relevance score above a threshold (e.g., "car", "vehicle", "convertible", "truck", and "van").

Figure 12:
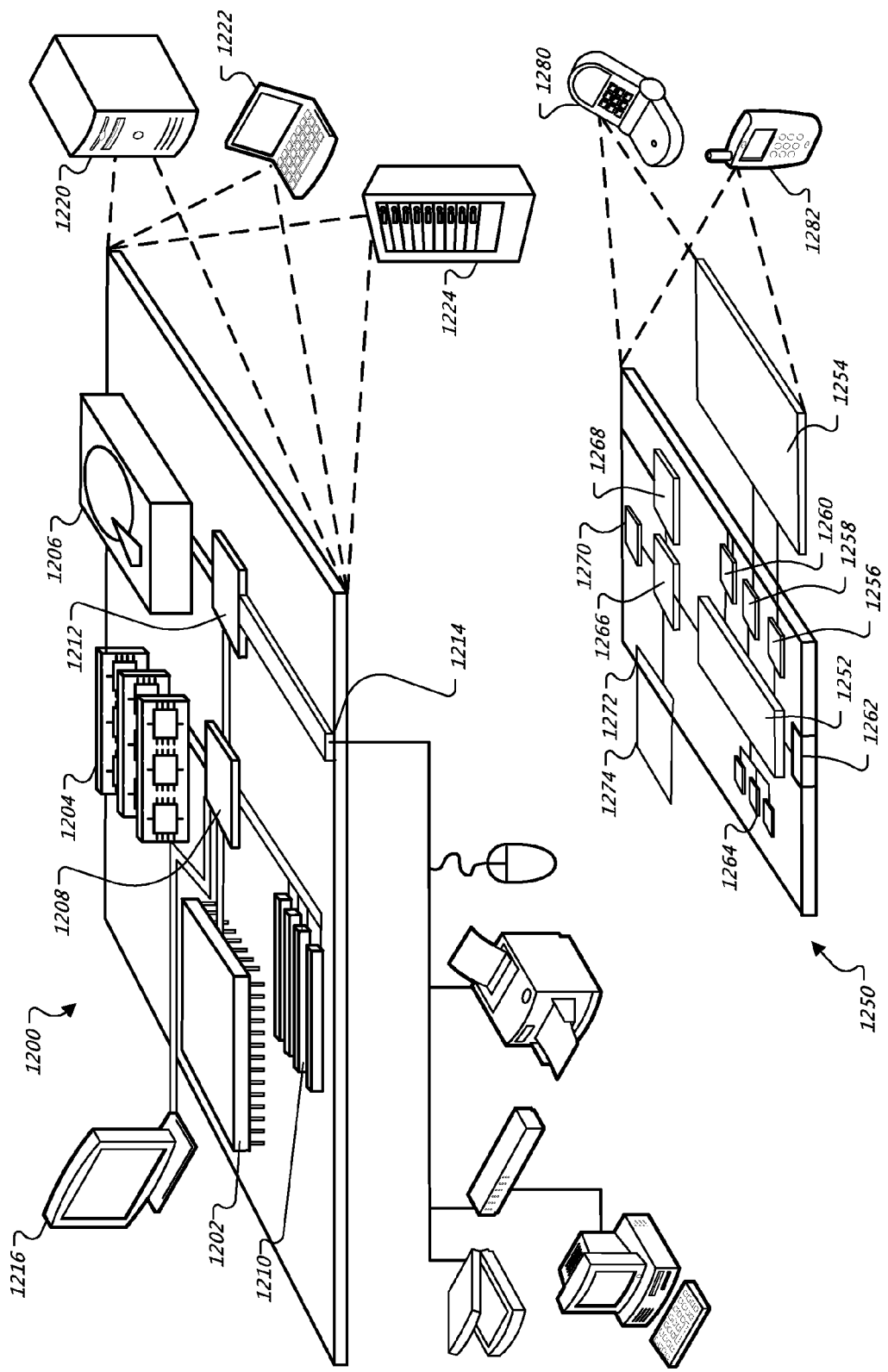
FIG. 12 is a block diagram of computing devices that may be used to implement the systems and methods described in this document, as either a client or as a server or plurality of servers.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. The computer-readable medium is not a propagating signal. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of duties is illustrative only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth™, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can process instructions for execution within the computing device 1250, including instructions stored in the memory 1264. The processor may also include separate analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Device 1250 may communicate wirelessly through communication interface 1266, which may include digital signal processing circuitry where necessary. Communication interface 1266 may provide for communications under various modes or protocols, such as GSM voice calls, SMS (Simple Message Service), EMS (Enhanced Message Service), or MMS (Multimedia messaging service) messaging, CDMA (Code Division Multiple Access), TDMA (Time Division Multiple Access), PDC (Personal Digital Cellular), WCDMA (Wideband CDMA), CDMA2000, or GPRS (General Packet Radio Service), among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communication audibly using audio codec 1260, which may receive spoken information from a user and convert it to usable digital information. Audio codex 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method using one or more computing processors for content selection, the method comprising:
   identifying a landing page associated with a creative, the creative being a content item that is to be displayed on a web site responsive to a received request for content, wherein the creative includes first associated keywords and wherein the landing page includes at least one image and other content;
   determining a prominence level of the at least one image included in the landing page based at least in part on a relative size, location or both of the at least one image;
   when the prominence level exceeds a predetermined level, evaluating pixel data associated with the at least one image including determining one or more labels that are associated with the content included within the at least one image;
   determining one or more additional keywords for the creative based at least in part on the one or more labels;
   replacing one or more of the first associated keywords with the one or more additional keywords producing an updated set of keywords; and storing the landing page including the updated set of keywords to enable searching and serving of the creative responsive to subsequent received requests for the content.

2. The method of claim 1, further comprising ranking the first associated keywords and the one or more additional keywords and selecting one or more top-ranked keywords including at least one of the one or more additional keywords as selection criteria to be associated with the creative.

3. The method of claim 2, wherein ranking the first associated keywords and the one or more additional keywords includes:
providing as an input to an evaluation engine the first associated keywords, the one or more additional keywords, and the image;
receiving as an output of the evaluation engine a relevance score for each of the first associated keywords and for each of the or more additional keywords that indicates a relevance of a given keyword to the image; and
ranking the first associated keywords and the one or more additional keywords based on the relevance scores.

4. The method of claim 1, further comprising augmenting the first associated keywords including adding the one or more additional keywords to the first associated keywords and using the augmented keywords as selection criteria to be associated with the creative.

5. The method of claim 1, wherein the determining the prominence level for the image further includes determining a relative portion of the content that is embodied in the image.

6. A computer-implemented method using one or more computing processors for content selection, the method comprising:
identifying a creative associated with an online campaign, the creative being a content item that is to be displayed on a web site responsive to a received request for content, wherein the creative includes first associated keywords;
determining a prominence level of an image included in the creative based at least in part one a relative size, location or both of the image;
when the prominence level exceeds a predetermined level, providing as an input to an evaluation engine the first associated keywords and the image and receiving as an output a relevance score for each of the first associated keywords that indicates a relevance of a given keyword to the image;
identifying one or more additional different keywords based on pixel data associated with the image; and
ranking the one or more additional different keywords;
comparing rankings of the first associated keywords and the one or more additional different keywords;
suggesting keywords for use with the creative including at least one of the one or more additional different keywords that are more relevant to the image than at least one of the first associated keywords;
replacing one or more of the first associated keywords with the one or more additional keywords producing an updated set of keywords;
storing the creative including the updated set of keywords to enable searching; and
serving of the landing page responsive to subsequent received requests for the content.

7. The method of claim 6, wherein the suggesting keywords for use with the creative further includes:
evaluating the pixel data associated with the image including determining one or more labels that are associated with the content included within the image; and
determining the suggested keywords for the image based at least in part on the one or more labels.

8. The method of claim 6, wherein the determining the prominence level of the image further includes determining a relative portion of the content that is embodied in the image.

9. A computer-implemented method using one or more computing processors, the method comprising
identifying a content item that is to be displayed on or as a web site responsive to a received request for content wherein the content item includes at least two images;
determining a prominence level of each image included in the content item based at least in part on a relative size, location or both of each image;
determining a most prominent image included in the content item based on the determined prominence level for each image;
when a prominence level for the most prominent image exceeds a predetermined level, evaluating pixel data associated with the most prominent image including determining one or more labels that are associated with the content included within the most prominent image;
determining one or more keywords for the content item based at least in part on the one or more labels; and
storing the content item including the determined one or more keywords to enable searching and serving of the content responsive to subsequent received requests for the content.

10. The method of claim 9, wherein the content item is a creative.

11. The method of claim 9, wherein the content item is a landing page associated with a creative.

12. The method of claim 9, wherein the content item is an advertisement.

13. The method of claim 9, wherein the determining the prominence level of a given image further includes determining a relative portion of the content that is embodied in the given image.

14. The method of claim 9, further comprising:
evaluating one or more supplied keywords associated with the content item including:
providing as an input to an evaluation engine the one or more supplied keywords and the image;
receiving as an output of the evaluation engine a relevance score for each supplied keyword that indicates a relevance of a given supplied keyword to the image; and
accepting the one or more supplied keywords based on the relevance scores or alternatively suggesting using the determined keywords based on the one or more labels as being keywords for use as selection criteria to be associated with the content item.

* * * * *